United States Patent
Chao et al.

(10) Patent No.: US 10,566,631 B2
(45) Date of Patent: Feb. 18, 2020

(54) ELECTROCATALYST AND FUEL CELL EMPLOYING THE SAME

(71) Applicant: INDUSTRIAL TECHNOLOGY RESEARCH INSTITUTE, Hsinchu (TW)

(72) Inventors: Wen-Hsuan Chao, Zhunan Township (TW); Chiung-Hui Huang, Tainan (TW); Ping-Hsing Yang, Tainan (TW); Shan-Haw Chiou, Baoshan Township (TW); Keng-Yang Chen, Zhudong Township (TW); Chien-Ming Lai, Zhubei (TW); Li-Duan Tsai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 162 days.

(21) Appl. No.: 15/387,961

(22) Filed: Dec. 22, 2016

(65) Prior Publication Data

US 2018/0034065 A1 Feb. 1, 2018

(30) Foreign Application Priority Data

Jul. 27, 2016 (TW) .............. 105123709 A
Nov. 15, 2016 (TW) .............. 105137206 A

(51) Int. Cl.
| | | |
|---|---|---|
| H01M 4/92 | (2006.01) | |
| H01M 4/86 | (2006.01) | |
| H01M 4/88 | (2006.01) | |
| H01M 4/90 | (2006.01) | |
| H01M 8/083 | (2016.01) | |
| H01M 8/08 | (2016.01) | |

(52) U.S. Cl.
CPC ......... *H01M 4/923* (2013.01); *H01M 4/8652* (2013.01); *H01M 4/8871* (2013.01); *H01M 4/90* (2013.01); *H01M 4/925* (2013.01); *H01M 4/926* (2013.01); *H01M 8/083* (2013.01); *H01M 8/08* (2013.01); *H01M 2004/8689* (2013.01)

(58) Field of Classification Search
CPC .. H01M 4/923; H01M 4/8652; H01M 4/8871; H01M 4/90; H01M 4/925; H01M 4/926; H01M 8/083; H01M 8/08; H01M 2004/8689

See application file for complete search history.

(56) References Cited

U.S. PATENT DOCUMENTS

| | | | | |
|---|---|---|---|---|
| 2004/0121219 | A1* | 6/2004 | Mei ............ | B82Y 30/00 429/483 |
| 2012/0070764 | A1 | 3/2012 | Chung et al. | |
| 2013/0210610 | A1 | 8/2013 | Veith et al. | |

FOREIGN PATENT DOCUMENTS

| | | | |
|---|---|---|---|
| CN | 101380594 | A | 3/2009 |
| CN | 102299347 | A | 12/2011 |
| CN | 102895984 | A | 1/2013 |
| CN | 105032460 | A | 11/2015 |
| JP | 2002-18288 | A | 1/2002 |
| JP | 2002008566 | * | 1/2002 |
| JP | 2004-79438 | A | 3/2004 |
| JP | 2005-63677 | A | 3/2005 |
| JP | 2007-245010 | A | 9/2007 |
| JP | 2012-43568 | A | 3/2012 |
| JP | 2016-62826 | A | 4/2016 |
| KR | 20150105059 | * | 9/2015 |
| TW | 544968 | B | 8/2003 |
| WO | WO 2007/043441 | A1 | 4/2007 |
| WO | WO 2009/075037 | A1 | 6/2009 |
| WO | WO 2014/111714 | A1 | 7/2014 |
| WO | WO-2016/100034 | A1 | 6/2016 |

OTHER PUBLICATIONS

English abstract for KR 20150105059 (Jang et al). (Year: 2015).*
Machine-assisted English translation for KR 20150105059 (Jang et al). (Year: 2015).*
JPO English abstract for JP 2002008566 (Horie) (Year: 2002).*
Machine-assisted English translation for JP 2002008566 (Horie) (Year: 2002).*
English abstract for CN 101380594 A (Year: 2009).*
Cui et al., "Mesoporous $Ti_{0.5}Cr_{0.5}N$ Supported PdAg Nanoalloy as Highly Active and Stable Catalysts for the Electro-oxidation of Formic Acid and Methanol," ASC NANO, vol. 8, No. 6, Jun. 24, 2014 (Published online May 16, 2014), pp. 6106-6113, XP055382665.
Extended European Search Report, dated Jun. 30, 2017, for European Application No. 16206083.4.
Japanese Notice of Allowance for corresponding Japanese Application No. 2016-254981, dated May 15, 2018.
Japanese Office Action for Japanese Application No. 2016-254981, dated Nov. 7, 2017, with a partial English translation.
Kuttiyiel et al., "Nitiride Stabilized PtNi Core-Shell Nanocatalyst for High Oxygen Reduction Activity," Nano Letters, vol. 12, 2012, pp. 6266-6271.
Vaughn II et al., "Solution Synthesis of Cu3PdN Nanocrystals as Ternary Metal Nitride Electrocatalysts for the Oxygen Reduction Reaction," Chemistry of Materials, vol. 26, 2014, p. 6226-6232.
Veith et al., "Evidence for the Formation of Nitrogen-Rich Platinum and Palldium Nitride Nanoparticles," Chemistry of Materials, vol. 25, 2013, p. 4936-4945(18 pages total).
Chinese Office Action for Application No. 201611149029.1, dated Oct. 28, 2019.

* cited by examiner

*Primary Examiner* — Amanda C. Walke
(74) *Attorney, Agent, or Firm* — Birch, Stewart, Kolasch & Birch, LLP

(57) ABSTRACT

An electrocatalyst is provided. The electrocatalyst includes Pd-containing metal nitride, wherein the metal is Co, Fe, Y, Lu, Sc, Ti, V, Cu, Ni, or a combination thereof. The molar ratio between the metal and Pd is greater than 0 and less than or equal to 0.8. A fuel cell utilizing the above electrocatalyst is further provided.

11 Claims, No Drawings

ELECTROCATALYST AND FUEL CELL EMPLOYING THE SAME

CROSS REFERENCE TO RELATED APPLICATIONS

The present application is based on, and claims priority from, Taiwan Application Serial Number 105123709, filed on Jul. 27, 2016, and Taiwan Application Serial Number 105137206, filed on Nov. 15, 2016, the disclosure of which is hereby incorporated by reference herein in its entirety.

TECHNICAL FIELD

The technical field relates to an electrocatalyst and a fuel cell employing the same.

BACKGROUND

Alternative sources of energy are increasingly necessary due anticipated shortage of conventionally sourced energy. Fuel cells are characterized as clean energy, and are therefore attractive options in several fields. The performance of fuel cells depends on their electrocatalysts. In other words, high-performance electrocatalysts will be critical to enhancing the fuel cell's performance. The electrolytes in the conventional fuel cells can be classified as acid, neutral, and alkaline. Because most metal material will be corroded in an acid or alkaline electrolyte, a noble metal having better anti-corrosive properties and a higher cost should be used. As such, the choices for an electrode material are limited. Among possible electrode materials, platinum (Pt) has excellent anti-corrosive properties and catalytic activity. However, Pt is too expensive to be commercialized. In an alkaline electrolyte, metal electrodes are less corroded, and so the types of suitable metals are increased. Although non-platinum metals have the advantage of low cost, their catalytic activities and onset potentials of the oxygen reduction reaction are still worse than those of Pt.

As such, development of a non-platinum electrocatalyst with a higher onset potential of the oxygen reduction reaction and a higher catalytic activity is called for improving the power generation efficiency of the fuel cell.

SUMMARY

One embodiment of the disclosure provides an electrocatalyst, comprising: Pd-containing metal nitride, wherein the metal is Co, Fe, Y, Lu, Sc, Ti, V, Cu, Ni, or a combination thereof, and the molar ratio between the metal and the Pd is greater than 0 and less than or equal to 0.8.

One embodiment of the disclosure provides a fuel cell, comprising: an anode; a cathode; an electrolyte disposed between the anode and the cathode; and an electrocatalyst layer disposed between the electrolyte and the cathode, wherein the electrocatalyst layer comprises Pd-containing metal nitride, wherein the metal is Co, Fe, Y, Lu, Sc, Ti, V, Cu, Ni, or a combination thereof, and the molar ratio between the metal and the Pd is greater than 0 and less than or equal to 0.8.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In one embodiment, an electrocatalyst is disclosed. Palladium (Pd) has an activity similar to that of platinum (Pt), but it costs less than Pt. A transition metal is selected through calculation and simulation (e.g. ab initio) to perform a nitridation of Pd alloy, which is proven in practice to design an electrocatalyst with conductivity and electrochemical activity. The electrocatalyst may include a Pd-containing metal nitride, wherein the molar ratio between the metal and Pd is greater than 0 and less than or equal to 0.8, and the metal is Co, Fe, Y, Lu, Sc, Ti, V, Cu, Ni, or a combination thereof. Because the above electrocatalyst has a higher onset potential of the oxygen reduction reaction and a higher activity, it will be less influenced by an ohmic resistance and an overpotential in a fuel cell, thereby consuming less energy to improve the fuel cell operation efficiency. As such, the above electrocatalyst can be employed in the fuel cell field.

In one embodiment, the metal in the electrocatalyst is Co, and the molar ratio between Co and Pd is greater than 0 and less than or equal to 0.115. In one embodiment, the metal in the electrocatalyst is Fe, and the molar ratio between Fe and Pd is greater than 0 and less than or equal to 0.083. In one embodiment, the metal in the electrocatalyst is Y, and the molar ratio between Y and Pd is greater than 0 and less than or equal to 0.065. In one embodiment, the metal in the electrocatalyst is Lu, and the molar ratio between Lu and Pd is greater than 0 and less than or equal to 0.034. In one embodiment, the metal in the electrocatalyst is Sc, and the molar ratio between Sc and Pd is greater than 0 and less than or equal to 0.079. In one embodiment, the metal in the electrocatalyst is Ti, and the molar ratio between Ti and Pd is greater than 0 and less than or equal to 0.107. In one embodiment, the metal in the electrocatalyst is V, and the molar ratio between V and Pd is greater than 0 and less than or equal to 0.290. In one embodiment, the metal in the electrocatalyst is Cu, and the molar ratio between Cu and Pd is greater than 0 and less than or equal to 0.615. In one embodiment, the metal in the electrocatalyst is Ni, and the molar ratio between Ni and Pd is greater than 0 and less than or equal to 0.652.

In one embodiment, the electrocatalyst is supported on a support, and the electrocatalyst is formed as a layer or a film supported on the support. In one embodiment, the electrocatalyst layer is wet deposited or dry deposited on the support. The dry deposition has a higher controllability for the composition ratio of the electrocatalyst layer than that of the wet deposition.

In one embodiment, the support can be composed of graphite, carbon nanotube, carbon fiber, carbon microsphere, or a combination thereof. Alternatively, the support can be composed of metal, conductive oxide, conductive nitride, or a combination thereof. Furthermore, the support can be composed of a nanowire, nanosphere, or a combination thereof of metal, conductive oxide, conductive nitride, or a combination thereof.

In another embodiment, a fuel cell is disclosed, which includes an anode, a cathode, a electrolyte disposed between the anode and the cathode, and an electrocatalyst layer disposed between the cathode and the electrolyte, wherein the electrocatalyst layer includes a Pd-containing metal nitride, wherein the molar ratio of the metal to Pd is greater than 0 and less than or equal to 0.8, and the metal is Co, Fe, Y, Lu, Sc, Ti, V, Cu, Ni, or a combination thereof.

In another embodiment of the fuel cell, the electrocatalyst layer is formed on the cathode.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1 (Manufacture and Activity Measurement of Electrocatalyst Pd-Containing Cobalt Nitride)

Electrocatalyst Pd-containing cobalt nitride layers were deposited on glassy carbon supports (5 mmOD×4 mmH, commercially available from Pine research instrumentation) by reactive magnetron sputtering to form electrodes, in which a Pd target (commercially available from Ultimate Materials Technology Co., Ltd.) and a Co target (commercially available from Ultimate Materials Technology Co., Ltd.) are co-sputtered under $N_2/(Ar+N_2)$ (½, 50%) to perform a reactive magnetron sputtering. The sputtering power for the Co target was changed to obtain different Co/Pd atomic ratios. The total flow rate of Ar and $N_2$ was 20 sccm, the sputtering pressure was controlled at 20 mTorr, the sputtering temperature was controlled at room temperature, and the sputtering cost 5 to 6 minutes. The electrocatalyst Pd-containing cobalt nitride layers had a thickness of about 100 nm. The Co/Pd atomic ratios of the electrocatalyst Pd-containing cobalt nitride layers were 0.005 to 0.682, which were analyzed by energy-dispersive spectroscopy (EDS).

Next, the electrochemical activities of the electrocatalyst Pd-containing cobalt nitride layers with the different Co/Pd atomic ratios were tested as below. In 0.1M KOH solution, a reversible hydrogen electrode was served as a reference electrode. The electrodes were scanned by a voltage range of 0.079V to 0.979V at a scan speed of 50 mV/s 10 times. CV and LSV of an oxygen reduction reaction (ORR) were then measured. In the CV measurement, the electrodes were scanned in a voltage range of 0.079V to 0.979V at a scan rate of 10 mV/s for 5 times. In the LSV measurement, the electrodes were rotated at a rate of 1600 rpm and scanned in a voltage range of 0.79V to 1.179V at a scan rate of 10 mV/s for 3 times. Onset potentials of the oxygen reduction reaction (e.g. Ewe (V) vs. RHE) and activity at an operation voltage of 0.8V (mA/mg) of the electrocatalyst Pd-containing cobalt nitride layers with different Co/Pd atomic ratios are tabulated in Table 1.

TABLE 1

(Pd-containing cobalt nitride)

| Item | Co/Pd atomic ratio | Onset potentials of the oxygen reduction reaction (V) | Catalytic activity at 0.8 V (mA/mg) |
|---|---|---|---|
| 1 | 0.005 | 1.00 | 25.58 |
| 2 | 0.007 | 1.02 | 29.23 |
| 3 | 0.015 | 1.03 | 31.11 |
| 4 | 0.021 | 1.03 | 31.64 |
| 5 | 0.031 | 0.99 | 28.70 |
| 6 | 0.036 | 0.99 | 27.60 |
| 7 | 0.056 | 0.95 | 23.08 |
| 8 | 0.067 | 0.95 | 23.40 |
| 9 | 0.115 | 0.94 | 15.31 |
| 10 | 0.182 | 0.91 | 14.04 |
| 11 | 0.250 | 0.91 | 9.79 |
| 12 | 0.682 | 0.89 | 5.96 |

Example 2 (Manufacture and Activity Measurement of Electrocatalyst Pd-Containing Iron Nitride)

The manufacture of the electrocatalyst was similar to that in Example 1, and the difference in Example 2 was the Co target being replaced with a Fe target (commercially available from Ultimate Materials Technology Co., Ltd.). The sputtering power for the Fe target was changed to obtain different Fe/Pd atomic ratios. The electrocatalyst Pd-containing iron nitride layers were deposited on glassy carbon supports to form electrodes. The Fe/Pd atomic ratios of the electrocatalyst Pd-containing iron nitride layers were 0.008 to 0.377, which were analyzed by EDS.

Next, the electrochemical activities of the electrocatalyst Pd-containing iron nitride layers with the different Fe/Pd atomic ratios were tested by a similar method to that in Example 1, as tabulated in Table 2.

TABLE 2

(Pd-containing iron nitride)

| Item | Fe/Pd atomic ratio | Onset potentials of the oxygen reduction reaction (V) | Catalytic activity at 0.8 V (mA/mg) |
|---|---|---|---|
| 1 | 0.008 | 0.9665 | 25.96 |
| 2 | 0.010 | 0.9662 | 26.69 |
| 3 | 0.016 | 0.9655 | 27.78 |
| 4 | 0.019 | 0.97 | 27.60 |
| 5 | 0.025 | 0.96 | 30.58 |
| 6 | 0.034 | 0.97 | 31.50 |
| 7 | 0.035 | 0.97 | 31.20 |
| 8 | 0.047 | 0.96 | 28.61 |
| 9 | 0.054 | 0.95 | 27.40 |
| 10 | 0.069 | 0.95 | 20.29 |
| 11 | 0.077 | 0.95 | 21.57 |
| 12 | 0.083 | 0.94 | 20.68 |
| 13 | 0.160 | 0.91 | 10.13 |
| 14 | 0.377 | 0.88 | 2.94 |

Example 3 (Manufacture and Activity Measurement of Electrocatalyst Pd-Containing Yttrium Nitride)

The manufacture of the electrocatalyst was similar to that in Example 1, and the difference in Example 2 was the Co target being replaced with a Y target (commercially available from Ultimate Materials Technology Co., Ltd.). The sputtering power for the Y target was changed to obtain different Y/Pd atomic ratios. The electrocatalyst Pd-containing yttrium nitride layers were deposited on glassy carbon supports to form electrodes. The Y/Pd atomic ratios of the electrocatalyst Pd-containing yttrium nitride layers were 0.010 to 0.188, which were analyzed by EDS.

Next, the electrochemical activities of the electrocatalyst Pd-containing yttrium nitride layers with the different Y/Pd atomic ratios were tested by a similar method to that in Example 1, as tabulated in Table 3.

TABLE 3

(Pd-containing yttrium nitride)

| Item | Y/Pd atomic ratio | Onset potentials of the oxygen reduction reaction (V) | Catalytic activity at 0.8 V (mA/mg) |
|---|---|---|---|
| 1 | 0.010 | 0.95 | 22.43 |
| 2 | 0.065 | 0.98 | 24.30 |
| 3 | 0.188 | 0.89 | 7.23 |

Example 4 (Manufacture and Activity Measurement of Electrocatalyst Pd-Containing Lutetium Nitride)

The manufacture of the electrocatalyst was similar to that in Example 1, and the difference in Example 4 was the Co target being replaced with a Lu target (commercially available from Ultimate Materials Technology Co., Ltd.). The sputtering power for the Lu target was changed to obtain different Lu/Pd atomic ratios. The electrocatalyst Pd-containing lutetium nitride layers were deposited on glassy carbon supports to form electrodes. The Lu/Pd atomic ratios of the electrocatalyst PdLuN layers were 0.010 to 0.390, which were analyzed by EDS.

Next, the electrochemical activities of the electrocatalyst Pd-containing lutetium nitride layers with the different Lu/Pd atomic ratios were tested by a similar method to that in Example 1, as tabulated in Table 4.

TABLE 4

(Pd-containing lutetium nitride)

| Item | Lu/Pd atomic ratio | Onset potentials of the oxygen reduction reaction (V) | Catalytic activity at 0.8 V (mA/mg) |
|---|---|---|---|
| 1 | 0.001 | 0.98 | 27.52 |
| 2 | 0.022 | 0.99 | 34.48 |
| 3 | 0.030 | 0.98 | 27.35 |
| 4 | 0.033 | 0.97 | 26.30 |
| 5 | 0.034 | 0.97 | 25.40 |
| 6 | 0.067 | 0.90 | 12.43 |
| 7 | 0.070 | 0.90 | 11.23 |
| 8 | 0.104 | 0.90 | 10.90 |
| 9 | 0.106 | 0.90 | 12.81 |
| 10 | 0.233 | 0.89 | 7.70 |
| 11 | 0.390 | 0.89 | 8.58 |

Example 5 (Manufacture and Activity Measurement of Electrocatalyst Pd-Containing Scandium Nitride)

The manufacture of the electrocatalyst was similar to that in Example 1, and the difference in Example 5 was the Co target being replaced with a Sc target (commercially available from Ultimate Materials Technology Co., Ltd.). The sputtering power for the Sc target was changed to obtain different Sc/Pd atomic ratios. The electrocatalyst Pd-containing scandium nitride layers were deposited on glassy carbon supports to form electrodes. The Sc/Pd atomic ratios of the electrocatalyst PdScN layers were 0.030 to 0.192, which were analyzed by EDS.

Next, the electrochemical activities of the electrocatalyst Pd-containing scandium nitride layers with the different Sc/Pd atomic ratios were tested by a similar method to that in Example 1, as tabulated in Table 5.

TABLE 5

(Pd-containing scandium nitride)

| Item | Sc/Pd atomic ratio | Onset potentials of the oxygen reduction reaction (V) | Catalytic activity at 0.8 V (mA/mg) |
|---|---|---|---|
| 1 | 0.030 | 0.95 | 27.36 |
| 2 | 0.036 | 0.97 | 24.70 |
| 3 | 0.062 | 0.93 | 24.04 |
| 4 | 0.068 | 0.92 | 22.81 |
| 5 | 0.079 | 0.91 | 20.09 |
| 6 | 0.192 | 0.90 | 12.18 |

Example 6 (Manufacture and Activity Measurement of Electrocatalyst Pd-Containing Titanium Nitride)

The manufacture of the electrocatalyst was similar to that in Example 1, and the difference in Example 6 was the Co target being replaced with a Ti target (commercially available from Ultimate Materials Technology Co., Ltd.). The sputtering power for the Ti target was changed to obtain different Ti/Pd atomic ratios. The electrocatalyst Pd-containing titanium nitride layers were deposited on glassy carbon supports to form electrodes. The Ti/Pd atomic ratios of the electrocatalyst Pd-containing titanium nitride layers were 0.043 to 0.408, which were analyzed by EDS.

Next, the electrochemical activities of the electrocatalyst Pd-containing titanium nitride layers with the different Ti/Pd atomic ratios were tested by a similar method to that in Example 1, as tabulated in Table 6.

TABLE 6

(Pd-containing titanium nitride)

| Item | Compositions | Onset potentials of the oxygen reduction reaction (V) | Catalytic activity at 0.8 V (mA/mg) |
|---|---|---|---|
| 1 | 0.043 | 0.95 | 20.85 |
| 2 | 0.061 | 0.94 | 19.57 |
| 3 | 0.107 | 0.93 | 16.60 |
| 4 | 0.152 | 0.93 | 14.89 |
| 5 | 0.163 | 0.93 | 14.04 |
| 6 | 0.408 | 0.89 | 2.30 |

Example 7 (Manufacture and Activity Measurement of Electrocatalyst Pd-Containing Vanadium Nitride)

The manufacture of the electrocatalyst was similar to that in Example 1, and the difference in Example 7 was the Co target being replaced with a V target (commercially available from Ultimate Materials Technology Co., Ltd.). The sputtering power for the V target was changed to obtain different V/Pd atomic ratios. The electrocatalyst Pd-containing vanadium nitride layers were deposited on glassy carbon supports to form electrodes. The V/Pd atomic ratios of the electrocatalyst Pd-containing vanadium nitride layers were 0.013 to 0.290, which were analyzed by EDS.

Next, the electrochemical activities of the electrocatalyst Pd-containing vanadium nitride layers with the different V/Pd atomic ratios were tested by a similar method to that in Example 1, as tabulated in Table 7.

TABLE 7

(Pd-containing vanadium nitride)

| Item | V/Pd atomic ratio | Onset potentials of the oxygen reduction reaction (V) | Catalytic activity at 0.8 V (mA/mg) |
|---|---|---|---|
| 1 | 0.013 | 0.93 | 19.57 |
| 2 | 0.017 | 0.93 | 20.85 |
| 3 | 0.026 | 0.94 | 22.55 |
| 4 | 0.034 | 0.94 | 22.55 |
| 5 | 0.063 | 0.96 | 22.13 |
| 6 | 0.084 | 0.95 | 23.40 |
| 7 | 0.118 | 0.94 | 22.55 |
| 8 | 0.290 | 0.95 | 23.40 |

Example 8 (Manufacture and Activity Measurement of Electrocatalyst Pd-Containing Copper Nitride)

The manufacture of the electrocatalyst was similar to that in Example 1, and the difference in Example 8 was the Co target being replaced with a Cu target (commercially available from Ultimate Materials Technology Co., Ltd.). The sputtering power for the Cu target was changed to obtain different Cu/Pd atomic ratios. The electrocatalyst Pd-containing copper nitride layers were deposited on glassy carbon supports to form electrodes. The Cu/Pd atomic ratios of the electrocatalyst Pd-containing copper nitride layers were 0.034 to 0.777, which were analyzed by EDS.

Next, the electrochemical activities of the electrocatalyst Pd-containing copper nitride layers with the different Cu/Pd atomic ratios were tested by a similar method to that in Example 1, as tabulated in Table 8.

TABLE 8

(Pd-containing copper nitride)

| Item | Cu/Pd atomic ratio | Onset potentials of the oxygen reduction reaction (V) | Catalytic activity at 0.8 V (mA/mg) |
|---|---|---|---|
| 1 | 0.034 | 0.9745 | 27.4 |
| 2 | 0.037 | 0.975 | 29.98 |
| 3 | 0.054 | 0.974 | 27.5 |
| 4 | 0.101 | 0.96 | 26.08 |
| 5 | 0.110 | 0.95 | 25.37 |
| 6 | 0.166 | 0.93 | 21.15 |
| 7 | 0.181 | 0.93 | 21.87 |
| 8 | 0.198 | 0.93 | 23.02 |
| 9 | 0.329 | 0.92 | 24.46 |
| 10 | 0.615 | 0.91 | 20.13 |
| 11 | 0.777 | 0.90 | 13.53 |

Example 9 (Manufacture and Activity Measurement of Electrocatalyst Pd-Containing Nickel Nitride)

The manufacture of the electrocatalyst was similar to that in Example 1, and the difference in Example 9 was the Co target being replaced with a Ni target (commercially available from Ultimate Materials Technology Co., Ltd.). The sputtering power for the Ni target was changed to obtain different Ni/Pd atomic ratios. The electrocatalyst Pd-containing nickel nitride layers were deposited on glassy carbon supports to form electrodes. The Ni/Pd atomic ratios of the electrocatalyst Pd-containing nickel nitride layers were 0.005 to 0.915, which were analyzed by EDS.

Next, the electrochemical activities of the electrocatalyst Pd-containing nickel nitride layers with the different Cu/Pd atomic ratios were tested by a similar method to that in Example 1, as tabulated in Table 9.

TABLE 9

(Pd-containing nickel nitride)

| Item | Ni/Pd atomic ratio | Onset potentials of the oxygen reduction reaction (V) | Catalytic activity at 0.8 V (mA/mg) |
|---|---|---|---|
| 1 | 0.005 | 0.97 | 15.34 |
| 2 | 0.013 | 0.98 | 46.39 |
| 3 | 0.033 | 0.98 | 41.33 |
| 4 | 0.055 | 0.96 | 27.53 |
| 5 | 0.090 | 0.95 | 27.72 |
| 6 | 0.155 | 0.96 | 29.23 |
| 7 | 0.221 | 0.96 | 32.00 |
| 8 | 0.275 | 0.99 | 38.97 |
| 9 | 0.419 | 0.97 | 30.30 |
| 10 | 0.652 | 0.96 | 26.19 |
| 11 | 0.915 | 0.92 | 10.45 |

Comparative Example 1 (Manufacture and Activity Measurement of Electrocatalyst Pt/C)

Pt/C (50 wt % Pt and 50 wt % C, TEC10V50E, commercially available from Tanaka) was dripped on glassy carbon (5 mmOD×4 mmH) to be baked, thereby forming a catalyst layer of Pt/C. Next, the electrochemical activity of the catalyst layer of Pt/C was tested by a similar method to that in Example 1, as tabulated in Table 10. As a result, the catalyst layer of Pt/C had an onset potential of the oxygen reduction reaction of 1.04V, and an activity of 15.2 mA/mg at an operation voltage of 0.8V.

Comparative Example 2 (Manufacture and Activity Measurement of Electrocatalyst Pd)

Pd (commercially available from Ultimate Materials Technology Co., Ltd.) was used to deposit a catalyst layer of Pd on glassy carbon (5 mmOD×4 mmH). Next, the electrochemical activity of the catalyst layer of Pd was tested by a similar method to that in Example 1, as tabulated in Table 10. As a result, the catalyst layer of Pd had an onset potential of the oxygen reduction reaction of 0.94V, and an activity of 24 mA/mg at an operation voltage of 0.8V.

Comparative Example 3 (Manufacture and Activity Measurement of Electrocatalyst PdN)

The manufacture of the electrocatalyst was similar to that in Example 1, and the difference in Example Comparative Example 2 was Pd target being sputtered under $N_2/(Ar+N_2)$ (½, 50%) to perform a reactive magnetron sputtering. The electrocatalyst PdN layer was deposited on a glassy carbon support to form an electrode. Next, the electrochemical activity of the electrocatalyst PdN layer was tested by a similar method to that in Example 1, as tabulated in Table 10. As a result, the electrocatalyst PdN layer had an onset potential of the oxygen reduction reaction of 0.97V, and an activity of 27.4 mA/mg at an operation voltage of 0.8V.

Comparative Example 4 (Manufacture and Activity Measurement of Electrocatalyst FeN)

The manufacture of the electrocatalyst was similar to that in Example 2, and the difference in Example Comparative Example 4 was Fe target being sputtered under $N_2/(Ar+N_2)$ (½, 50%) to perform a reactive magnetron sputtering. The electrocatalyst FeN layer was deposited on a glassy carbon support to form an electrode. Next, the electrochemical activity of the electrocatalyst FeN layer was tested by a similar method to that in Example 1, as tabulated in Table 10.

Comparative Example 5 (Manufacture and Activity Measurement of Electrocatalyst TiN)

The manufacture of the electrocatalyst was similar to that in Example 6, and the difference in Example Comparative Example 5 was Ti target being sputtered under $N_2/(Ar+N_2)$ (½, 50%) to perform a reactive magnetron sputtering. The electrocatalyst TiN layer was deposited on a glassy carbon support to form an electrode. Next, the electrochemical activity of the electrocatalyst TiN layer was tested by a similar method to that in Example 1, as tabulated in Table 10.

alkaline condition have higher onset potentials of the oxygen reduction reaction when the molar ratio between the metal and the Pd is lower, which resulted from an electron cloud of Pd—N-M and the electron configuration change. The electron cloud and d-band center position of the electron configuration represent the bonding strength between the catalyst and oxygen. If the d-band center position can be efficiently downshifted, the bonding strength between oxygen and the catalyst surface can be lowered for efficiently improving the oxygen reduction reaction (ORR). In other words, the total activity of the catalyst is therefore enhanced. According to the Brewer intermetallic bonding theory, the electronic orbital hybrid of the hypo-hyper d-electronic transition metal may result in synergistic effect between the d-electron orbital, which may efficiently enhance the total activity. As such, the electrocatalysts Pd-containing metal nitride (of different metal/Pd atomic ratios) with the onset potentials of the oxygen reduction reaction similar to that of the commercially available catalyst Pt/C, and the catalytic

TABLE 10

(Comparison of Examples 1 to 9 and Comparative Examples 1 to 5)

| Item | Composition | Metal/Pd atomic ratio | Onset potential of the oxygen reduction reaction (V) | Catalytic activity at 0.8 V(mA/mg) |
|---|---|---|---|---|
| Example 1 | Pd-containing cobalt nitride | 0.005-0.682 | 1.03-0.89 | 31.64-5.96 |
| Example 2 | Pd-containing iron nitride | 0.008-0.377 | 0.97-0.88 | 31.50-2.94 |
| Example 3 | Pd-containing yttrium nitride | 0.010-0.188 | 0.98-0.89 | 24.3-7.23 |
| Example 4 | Pd-containing Lutetium nitride | 0.001-0.390 | 0.99-0.89 | 34.48-7.70 |
| Example 5 | Pd-containing scandium nitride | 0.030-0.192 | 0.97-0.90 | 27.36-12.18 |
| Example 6 | Pd-containing titanium nitride | 0.043-0.408 | 0.95-0.89 | 20.85-2.30 |
| Example 7 | Pd-containing vanadium nitride | 0.013-0.290 | 0.93-0.96 | 23.40-19.57 |
| Example 8 | Pd-containing copper nitride | 0.034-0.777 | 0.975-0.90 | 29.98-13.53 |
| Example 9 | Pd-containing nickel nitride | 0.005-0.915 | 0.99-0.92 | 46.39-10.45 |
| Comparative Example 1 | Pt/C | | 1.04 | 15.2 |
| Comparative Example 2 | Pd | | 0.94 | 24.0 |
| Comparative Example 3 | PdN | | 0.97 | 27.4 |
| Comparative Example 4 | FeN | | 0.43 | 0.41 |
| Comparative Example 5 | TiN | | 0.83 | 0.29 |

Tables 1 to 9 show that the electrocatalysts Pd-containing metal nitride (with different metal/Pd atomic ratios) in an alkaline condition have activities higher than that of the commercially available catalyst Pt/C can be selected, as tabulated in Table 11.

TABLE 11

(Electrocatalysts Pd-containing metal nitride with higher catalytic activities than that of a commercially available catalyst Pt/C)

| Item | Pd-containing metal nitride | Metal/Pd atomic ratio | Onset potentials of the oxygen reduction reaction (V) | Catalytic activity at 0.8 V (mA/mg) |
|---|---|---|---|---|
| Example 1 | Pd-containing cobalt nitride | 0.005-0.115 | 1.03-0.94 | 31.64-15.31 |
| Example 2 | Pd-containing iron nitride | 0.008-0.083 | 0.97-0.94 | 31.50-20.68 |
| Example 3 | Pd-containing yttrium nitride | 0.010-0.065 | 0.98-0.95 | 24.3-22.43 |

TABLE 11-continued (Electrocatalysts Pd-containing metal nitride with higher catalytic activities than that of a commercially available catalyst Pt/C)

| Item | Pd-containing metal nitride | Metal/Pd atomic ratio | Onset potentials of the oxygen reduction reaction (V) | Catalytic activity at 0.8 V (mA/mg) |
|---|---|---|---|---|
| Example 4 | Pd-containing Lutetium nitride | 0.001-0.034 | 0.99-0.97 | 34.48-25.4 |
| Example 5 | Pd-containing scandium nitride | 0.030-0.079 | 0.97-0.91 | 27.36-20.09 |
| Example 6 | Pd-containing titanium nitride | 0.043-0.107 | 0.95-0.93 | 20.85-16.60 |
| Example 7 | Pd-containing vanadium nitride | 0.013-0.290 | 0.93-0.96 | 23.40-19.57 |
| Example 8 | Pd-containing copper nitride | 0.034-0.615 | 0.975-0.91 | 29.98-20.13 |
| Example 9 | Pd-containing nickel nitride | 0.005-0.652 | 0.99-0.95 | 46.39-15.34 |
| Comparative Example 1 | Pt/C | — | 1.04 | 15.2 |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A Pd-containing metal nitride electrocatalyst deposited directly on a support, comprising:
    Pd-containing metal nitride,
    wherein the metal is Co, Fe, Y, Lu, Sc, Cu, Ni, or a combination thereof, and
    the molar ratio between the metal and the Pd is greater than 0 and less than or equal to 0.8, and
    the support comprises graphite, carbon nanotube, carbon fiber, carbon microsphere, metal, conductive oxide, conductive nitride, or a combination thereof,
    when the metal is Co, the molar ratio between Co and Pd is greater than 0 and less than or equal to 0.067;
    when the metal is Fe, the molar ratio between Fe and Pd is greater than 0 and less than or equal to 0.083;
    when the metal is Y, the molar ratio between Y and Pd is greater than 0 and less than or equal to 0.065;
    when the metal is Lu, the molar ratio between Lu and Pd is greater than 0 and less than or equal to 0.034;
    when the metal is Sc, the molar ratio between Sc and Pd is greater than 0 and less than or equal to 0.079;
    when the metal is Cu, the molar ratio between Cu and Pd is greater than 0 and less than or equal to 0.615; or
    when the metal is Ni, the molar ratio between Ni and Pd is 0.013-0.033 or 0.221-0.419.

2. The Pd-containing metal nitride electrocatalyst deposited directly on the support as claimed in claim 1, wherein the metal is Co, and the molar ratio between Co and Pd is greater than 0 and less than or equal to 0.067.

3. The Pd-containing metal nitride electrocatalyst deposited directly on the support as claimed in claim 1, wherein the metal is Fe, and the molar ratio between Fe and Pd is greater than 0 and less than or equal to 0.083.

4. The Pd-containing metal nitride electrocatalyst deposited directly on the support as claimed in claim 1, wherein the metal is Y, and the molar ratio between Y and Pd is greater than 0 and less than or equal to 0.065.

5. The Pd-containing metal nitride electrocatalyst deposited directly on the support as claimed in claim 1, wherein the metal is Lu, and the molar ratio between Lu and Pd is greater than 0 and less than or equal to 0.034.

6. The Pd-containing metal nitride electrocatalyst deposited directly on the support as claimed in claim 1, wherein the metal is Sc, and the molar ratio between Sc and Pd is greater than 0 and less than or equal to 0.079.

7. The Pd-containing metal nitride electrocatalyst deposited directly on the support as claimed in claim 1, wherein the metal is Cu, and the molar ratio between Cu and Pd is greater than 0 and less than or equal to 0.615.

8. The Pd-containing metal nitride electrocatalyst deposited directly on the support as claimed in claim 1, wherein the metal is Ni, and the molar ratio between Ni and Pd is 0.013-0.033 or 0.221-0.419.

9. The Pd-containing metal nitride electrocatalyst deposited directly on the support as claimed in claim 1, wherein the Pd-containing metal nitride electrocatalyst is a layer or a film.

10. A fuel cell, comprising:
    an anode;
    a cathode;
    an electrolyte disposed between the anode and the cathode; and
    an electrocatalyst layer disposed between the electrolyte and the cathode, wherein the electrocatalyst layer comprises:
    Pd-containing metal nitride,
    wherein the metal is Co, Fe, Y, Lu, Sc, Cu, Ni, or a combination thereof, and
    the molar ratio between the metal and the Pd is greater than 0 and less than or equal to 0.8,
    when the metal is Co, the molar ratio between Co and Pd is greater than 0 and less than or equal to 0.067;
    when the metal is Fe, the molar ratio between Fe and Pd is greater than 0 and less than or equal to 0.083;
    when the metal is Y, the molar ratio between Y and Pd is greater than 0 and less than or equal to 0.065;
    when the metal is Lu, the molar ratio between Lu and Pd is greater than 0 and less than or equal to 0.034;
    when the metal is Sc, the molar ratio between Sc and Pd is greater than 0 and less than or equal to 0.079;
    when the metal is Cu, the molar ratio between Cu and Pd is greater than 0 and less than or equal to 0.615; or
    when the metal is Ni, the molar ratio between Ni and Pd is 0.013-0.033 or 0.221-0.419.

11. The fuel cell as claimed in claim 10, wherein the electrocatalyst layer is formed on the cathode.

* * * * *